(12) United States Patent
Lange et al.

(10) Patent No.: US 7,611,790 B2
(45) Date of Patent: Nov. 3, 2009

(54) ZINC/AIR BATTERY WITH IMPROVED LIFETIME

(75) Inventors: Dirk Lange, Bersenbrueck (DE); Wilhelm Frey, Mountain View, CA (US); Bhaskar Srinivasan, Belmont, CA (US)

(73) Assignee: Robert Bosch GmbH, Stuttgart (DE)

( * ) Notice: Subject to any disclaimer, the term of this patent is extended or adjusted under 35 U.S.C. 154(b) by 773 days.

(21) Appl. No.: 11/137,084

(22) Filed: May 24, 2005

(65) Prior Publication Data

US 2006/0269811 A1 Nov. 30, 2006

(51) Int. Cl.
*H01M 2/08* (2006.01)
*H01M 12/06* (2006.01)

(52) U.S. Cl. .................................... 429/27; 429/50
(58) Field of Classification Search ............. 429/27
See application file for complete search history.

(56) References Cited

U.S. PATENT DOCUMENTS 3,321,335 A    5/1967  Burton
3,693,068 A    9/1972  Bogue et al.
6,730,433 B2 *  5/2004  Buckle et al. .............. 429/164
2002/0150814 A1* 10/2002  Causton et al. ............... 429/82
2003/0186099 A1  10/2003  Liu et al.
2004/0048145 A1*  3/2004  Causton et al. ............... 429/82
2004/0224195 A1  11/2004  Huang et al.

FOREIGN PATENT DOCUMENTS

JP    07302623 A  * 11/1995

OTHER PUBLICATIONS

International Search Report, Dec. 14, 2006, International Patent Application PCT/US2006/018818.
Written Opinion of The International Searching Authority for International Patent Application PCT/US2006/018818.

* cited by examiner

*Primary Examiner*—Gregg Cantelmo
(74) *Attorney, Agent, or Firm*—Kenyon & Kenyon LLP

(57) ABSTRACT

A zinc/air battery includes a plurality zinc/air battery cells and an arrangement for exposing the plurality of zinc/air battery cells to air wherein the exposing arrangement opens the plurality of zinc/air battery cells in a serial manner such that only one cell is operative at a time.

9 Claims, 3 Drawing Sheets

ZINC/AIR BATTERY WITH IMPROVED LIFETIME

FIELD OF THE INVENTION

The present application relates to batteries, and more particularly relates to a zinc/air battery arrangement having an improved operational lifetime.

BACKGROUND INFORMATION

Various electronic systems rely on batteries for the supply of power. One of the drawbacks of using batteries is their limited energy density and operational lifetime which often makes it necessary to exchange batteries on a more regular basis. Such regular exchange may be inconvenient in many applications. For example, it may be difficult to exchange batteries of remotely placed sensors that operate on battery power, such as smoke or intrusion detectors. In such applications, it is advantageous for the battery (or battery arrangement) to last as long as possible. For a fixed storage volume, it is then important in such applications to use batteries having a high energy density.

FIG. 1 shows a plot of the characteristics of specific energy, measured in Wh/kg (Watt-hours per kilogram), versus energy density, measured in Wh/l (Watt-hours per liter) for several common battery types. As shown, out of this group of commonly available batteries, zinc/air batteries generally have the highest specific energies and energy densities, which can reach levels of more than 1000 Wh/l. Zinc/air batteries generate electrical energy from redox reactions using oxygen derived from the environment. While zinc/air batteries have high energy densities, they suffer from the drawback that they degrade quickly once the battery is exposed to the environment. The lifetime of zinc/air batteries commonly used in automotive applications, for example, may be limited to approximately 12 weeks.

In light of the useful characteristics of zinc/air batteries and their associated drawbacks, it would be advantageous to provide a zinc/air battery system and arrangement that has a longer lifetime, particularly for applications in which it is costly or inconvenient to replace depleted battery power supplies.

SUMMARY OF THE INVENTION

An exemplary zinc/air battery according to the present invention includes a plurality zinc/air battery cells and means for exposing each of the plurality of zinc/air battery cells to air, wherein the means for exposing opens the plurality of zinc/air battery cells in a serial manner such that only one cell is operative at a time.

In an exemplary embodiment of the zinc/air battery of the present invention, the arrangement for exposing the plurality of cells to air includes a perishable sealant.

In another exemplary embodiment of the zinc/air battery of the present invention, the arrangement for exposing the plurality of cells to air includes a heating mechanism for removing a sealant.

In yet another exemplary embodiment of the zinc/air battery of the present invention, the arrangement for exposing the plurality of cells to air includes a pressure elevating mechanism for breaking open a sealant.

In still another exemplary embodiment of the zinc/air battery of the present invention, each of the plurality of cells has a volume of approximately 200 µl. According to a particular implementation, the battery may include at least 80 cells and may have a lifetime of at least 12 years.

Another exemplary embodiment of the zinc/air battery of the present invention includes a control unit coupled to each of the plurality of cells for monitoring a depletion of the cells and triggering an opening of one of the plurality of cells at a time by operating the exposing means.

An exemplary method according to the present invention for extending the lifetime of a zinc/air battery including a plurality of zinc/air battery cells includes providing each of the plurality of cells with an air sealant and serially operating the plurality of cells, one cell at a time, by removing the air sealant on an inactive cell once an active cell is depleted.

In an exemplary embodiment of the method according to the present invention, the active cell is monitored for depletion and upon detection of depletion of the active cell, the sealant is removed from a further inactive cell, which activates the further cell.

In another exemplary embodiment of the method for extending the lifetime of a zinc/air battery according to the present invention, a material coupled to the sealant of the further cell is heated, and the heated material opens pores in the air sealant.

In still another exemplary embodiment of the method for extending the lifetime of a zinc/air battery according to the present invention, a pressure of a gas in proximity to the sealant is elevated which causes the sealant to be broken.

In yet another exemplary embodiment of the method for extending the lifetime of a zinc/air battery according to the present invention, the sealant of each of the plurality of cells includes a different diffusion constant, such that each sealant degrades at a different rate, resulting in serial operation.

According to a particular implementation of the method for extending the lifetime of a zinc/air battery according to the present invention, the zinc/air battery may include at least 80 cells.

DETAILED DESCRIPTION

In an exemplary embodiment, a battery system includes a series of individual zinc/air battery cells arranged compartmentally in an array. According to an exemplary system and/or method of the present invention, only one battery cell is exposed to air and operated at a time, while the rest of the non-depleted battery cells in the array are conserved. In this manner, the cumulative lifetime of the entire array of battery cells can reach several years.

Figure 1:
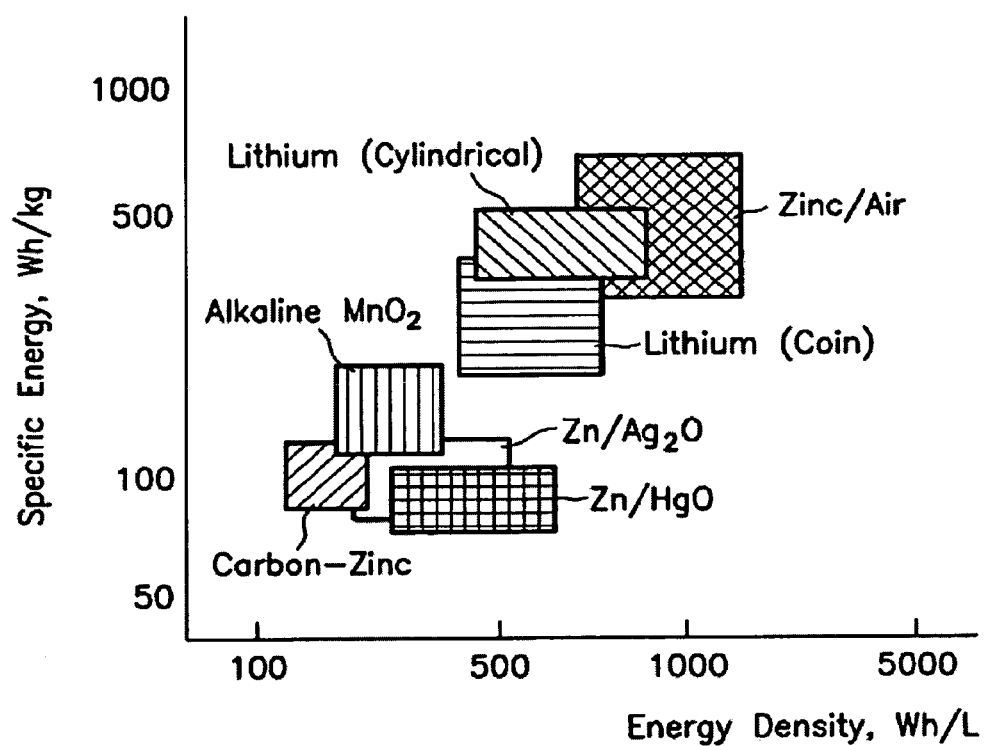
FIG. 1 shows a chart comparing the ranges of specific energy and energy density of various types of batteries.
Figure 2:
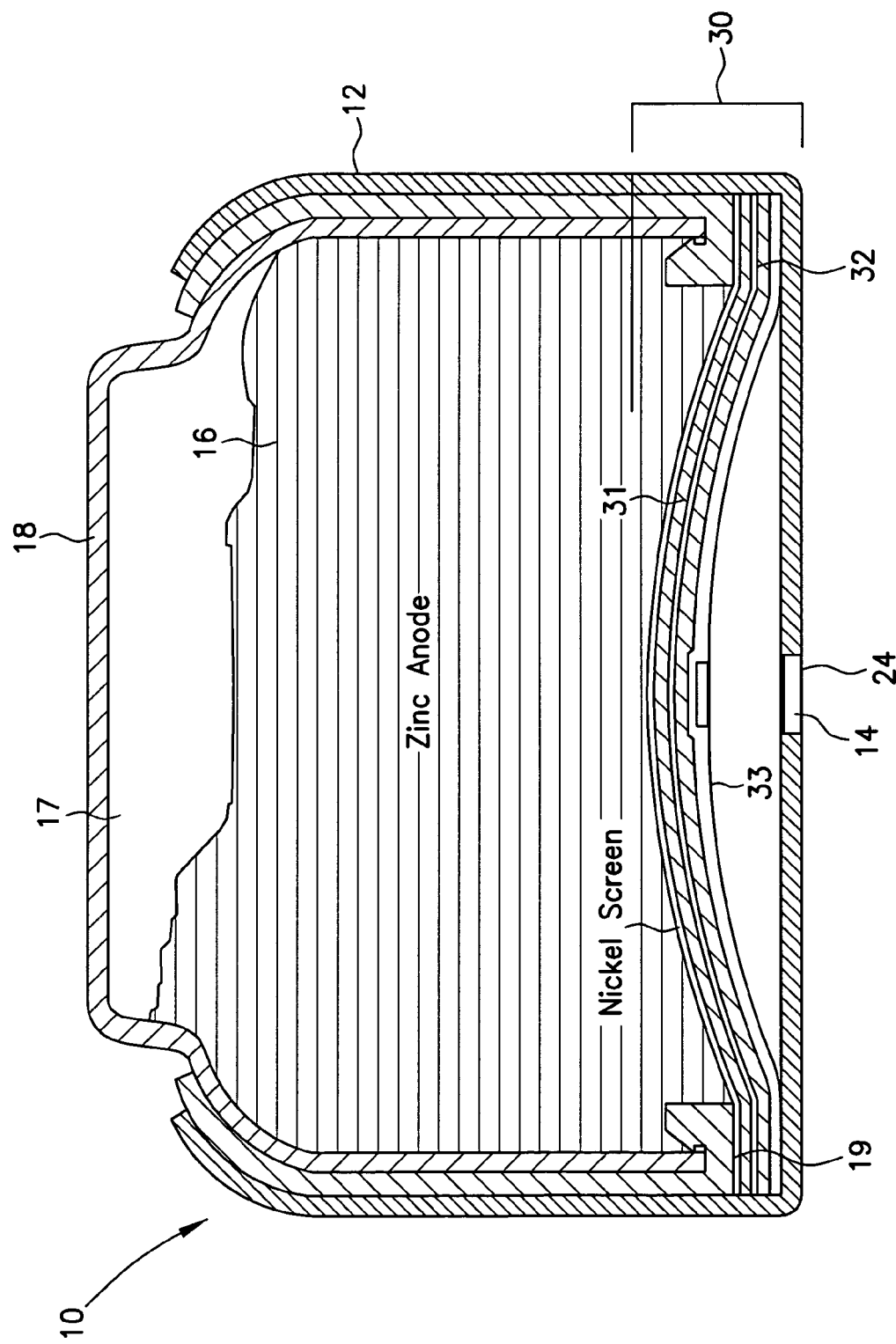
FIG. 2 shows an example embodiment of a zinc/air battery cell according to the present invention.

FIG. 2 illustrates an exemplary battery cell 10 of a zinc/air battery system according to the present invention. An outermost shell layer 12, which substantially surrounds the cell on a bottom portion and right and left sides, may be made of a metallic material and thus provides a self-supporting structure for the cell. The shell layer 12 may comprise or include a conductive material, such as a metallic material, that acts as a cathode. The bottom portion of the shell layer includes one or more air holes 14 (one is shown) which, when opened, allows oxygen to enter the cell to produce the redox reactions that generate the electrical circuit of the battery. While the cell is not being used, a thin sealing tab 24 blocks the entrance to the air hole so that the cell remains unexposed to oxygen.

Within the cell 10 and comprising a substantial percentage of its volume is an anode 16, which is composed of zinc, a gelling agent and an aqueous solution of potassium hydroxide, which constitutes the electrolyte. An anode cup 18 encloses the top of the anode 16 and surrounds it laterally, there being a void volume 17 between the top portion of the anode and the anode cup. The anode cup interconnects to a flange portion of a gasket 19 which forms an insulating layer separating the anode cup from the cathode shell layer 12. The cathode, or air electrode 30, which is formed from several stacked layers, encloses the bottom of the zinc anode. The layer directly in contact with the zinc anode 16 is a separator 31 that acts as an ion conductor between the electrodes but also acts as an insulator to prevent internal short-circuiting. Beneath the separator lies a nickel screen layer 32, which may include reaction catalysts supported by a nickel-mesh screen. This nickel screen layer 32 constitutes the active cathode. One or more teflon membrane layers 33 support the nickel screen layer and form a first cathode seal. A porous air distribution layer is situated beneath the teflon layers 33 which helps ensure uniform air distribution across the air electrode.

In terms of operation, power is derived from the reduction of oxygen at the air electrode, and the oxidation of zinc at the anode. At the air electrode 30, atmospheric oxygen reacts with catalysts and electrolyte to produce hydroxide ions:

$$\tfrac{1}{2}O_2 + H_2O + 2e^- \rightarrow 2OH^-$$

The hydroxide ions pass are able to migrate through the separator 31 and react with zinc to produce zinc hydroxide ions and free electrons:

$$Zn + 4OH^- \rightarrow Zn(OH)_4^{2-} + 2e^-$$

As the discharge proceeds, the zinc hydroxide ions eventually precipitate to form zinc oxide water and hydroxide ions:

$$Zn(OH)_4^{2-} \rightarrow ZnO + H_2O + 2OH^-$$

Figure 3:
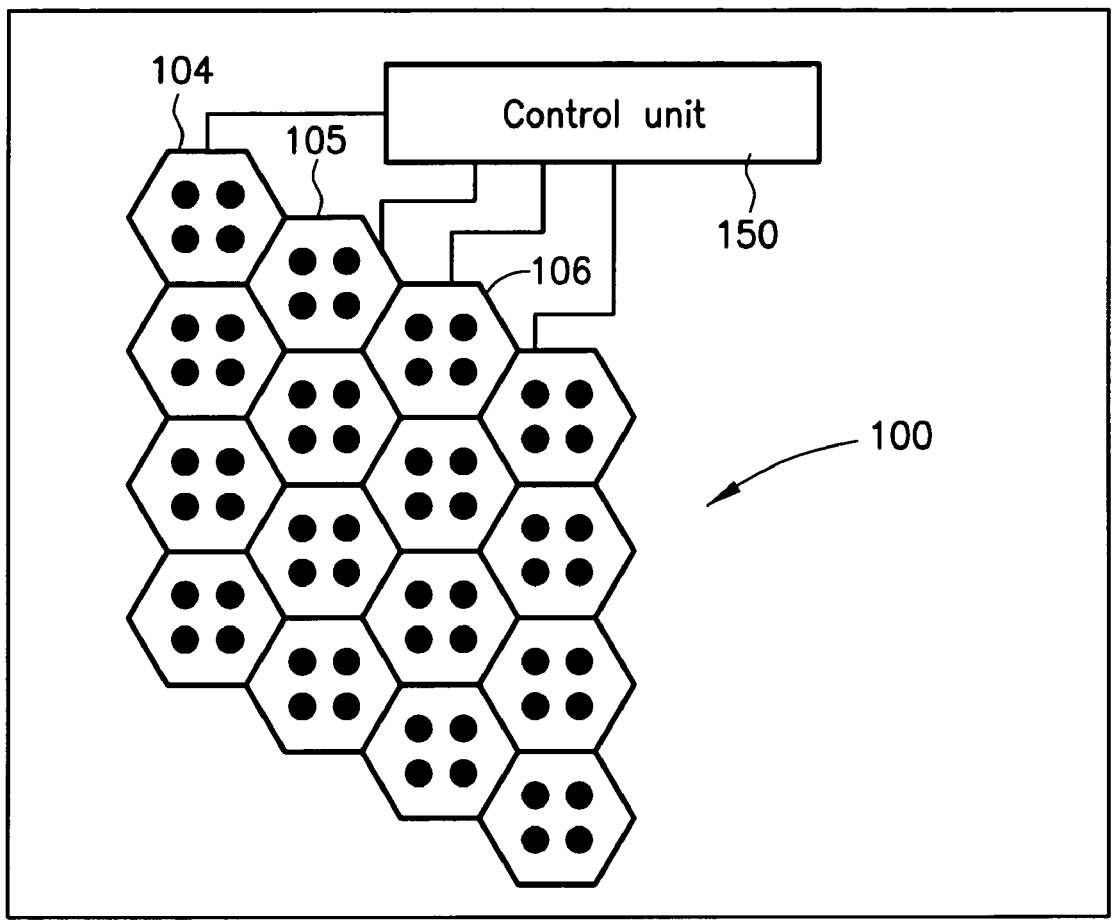
FIG. 3 shows an example zinc/air battery cell arrangement according to the present invention.

FIG. 3 shows an exemplary compartmentalized array arrangement of zinc cells 100 according to the present invention. Each battery cell, e.g., cells 104, 105, 106, etc., may have a cell volume of approximately 200 microliters (μl) (equaling about 790 Joules in energy content) and may be sufficient to operate a 110 microwatt load for between three and twelve weeks. Importantly, cells that have not yet been used are sealed for protection against air, humidity and carbon dioxide exposure. As shown, each cell 104, 105, 106 includes four access air holes, although a smaller or larger number of cells may also be used. A control unit 150 is coupled to each of the cells 104, 105, 106 and both monitors the depletion of operating cells via discharge characteristics and triggers the opening of air holes of individual cells to initiate their operation.

According to one embodiment of the present invention, more than 80 cells can be fit into the volume of two standard AA-cells of 16.0 milliliters yielding a potential battery lifetime of up to 18 years. Packaging losses may reduce this lifetime to some extent, but even with this consideration, the compartmentalized array arrangement increases the average zinc/air battery lifetime by at least a factor of three.

In order to have the cells operate in a sequential manner, so that non-operative cells can be protected from exposure, the control unit may employ any one of a variety of mechanisms for opening (either suddenly or gradually) the air holes of individual battery cells. For example, a heating operation may be employed to fuse material that opens pores in the sealing caps. Mechanical pressure for opening the holes may be generated by electrolysis, or by heating of a gas contained in a small chamber in the cap. Alternatively, a chemical degradation of the seal may be employed. In this case, the seals of each of the cells which protect air from entering the cell through the air holes may include a perishable membrane that degrades over time from exposure to oxygen. The diffusion constants (whih may be constant or varying over time) of the various membranes can be staggered such that the time at which the seal of one cell is expected to degrade completely approximately matches the time at which the seal of the next cell begins to degrade. In this manner, the one-cell-at-a-time sequential operation of the arrangement can be implemented. Each of these techniques are regulated or modified by the control unit 150 via feedback control of heating, mechanical and electrochemical processes.

What is claimed is:

1. A zinc/air battery, comprising:
   a plurality of zinc/air battery cells; and
   an arrangement configured to expose the plurality of zinc/air battery cells to air by opening the plurality of zinc/air battery cells in a serial manner such that the plurality of cells are serially activated;
   wherein the exposing arrangement includes a heating mechanism for heating a material coupled to a sealant, the heated material thereby opening pores in the sealant, the sealant thereby being removed.

2. The zinc/air battery of claim 1, wherein the opening of the plurality of zinc/air battery cells includes permanently opening the plurality of zinc/air battery cells.

3. The zinc/air battery of claim 1, wherein each of the plurality of cells has a volume of approximately 200 μl.

4. The zinc/air battery of claim 3, wherein the plurality of cells includes at least 80 cells.

5. The zinc/air battery of claim 4, wherein the exposing arrangement is configured such that the battery has a lifetime of at least 12 years.

6. The zinc/air battery of claim 1, further comprising:
   a control unit coupled to each of the plurality of cells for monitoring a depletion of the cells and to trigger an opening of one of the plurality of cells at a time by operating the exposing arrangement.

7. A method for extending the lifetime of a zinc/air battery including a plurality of zinc/air battery cells, the method comprising:
   providing each of the plurality of cells with an air sealant; and
   exposing the plurality of cells to air by opening the plurality of zinc/air battery cells in a serial manner such that the plurality of cells are serially activated, wherein the exposing includes heating a material coupled to the air sealant, the heated material thereby opening pores in the sealant, the sealant thereby being removed.

8. The method of claim 7, further comprising:
   monitoring a depletion of the cells.

9. The method of claim 7, wherein the zinc/air battery includes at least 80 cells.

* * * * *

UNITED STATES PATENT AND TRADEMARK OFFICE
CERTIFICATE OF CORRECTION

PATENT NO. : 7,611,790 B2  Page 1 of 1
APPLICATION NO. : 11/137084
DATED : November 3, 2009
INVENTOR(S) : Lange et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Twelfth Day of October, 2010

David J. Kappos
*Director of the United States Patent and Trademark Office*